(12) United States Patent
Birmiwal et al.

(10) Patent No.: US 12,739,198 B2
(45) Date of Patent: Sep. 15, 2026

(54) SYSTEM AND METHOD FOR SUPPORTING VRF-BASED TRAFFIC ISOLATION ACROSS A NETWORK WITH DYNAMIC PROVISIONING

(71) Applicant: Arista Networks, Inc., Santa Clara, CA (US)

(72) Inventors: Sharad Birmiwal, Burnaby (CA); Sriram Chidambaram, Saratoga, CA (US); Akshay Gattani, Sunnyvale, CA (US); Kartik Chandran, Los Altos, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 28 days.

(21) Appl. No.: 18/902,403

(22) Filed: Sep. 30, 2024

(65) Prior Publication Data

US 2026/0095407 A1 Apr. 2, 2026

(51) Int. Cl.

| | |
|---|---|
| ***G06F 15/173*** | (2006.01) |
| ***H04L 45/00*** | (2022.01) |
| ***H04L 45/586*** | (2022.01) |
| ***H04L 45/74*** | (2022.01) |

(52) U.S. Cl.

CPC ............ *H04L 45/586* (2013.01); *H04L 45/54* (2013.01); *H04L 45/74* (2013.01)

(58) Field of Classification Search

CPC ........ H04L 45/586; H04L 45/54; H04L 45/74

See application file for complete search history.

(56) References Cited

U.S. PATENT DOCUMENTS

2021/0328917 A1* 10/2021 Menon .................. H04L 45/566
2023/0079209 A1* 3/2023 Nallamothu ........ H04L 12/4625 709/238

* cited by examiner

*Primary Examiner* — Padma Mundur

(74) *Attorney, Agent, or Firm* — Fountainhead Law Group, PC

(57) ABSTRACT

A method for virtual routing and forwarding (VRF) support across a network with dynamic provisioning. A network device receives route information that includes a traffic isolation context label for a traffic isolation context, and host reachability information, where the route information is received over a network interface of the second network device. The network device identifies a target VRF into which to import a route. The network device configures a subinterface on the network interface over which it received the route information, including binding the subinterface to the target VRF and configuring the subinterface to insert the traffic isolation context label into network traffic. The network device imports reachability for a next hop network device and a route into the target VRF.

20 Claims, 6 Drawing Sheets

1000

1002
Receive Route Info. From Next Hop

1004
Target VRF Exist
no
yes

Create Target VRF
1006

1008
Sub-Interface Configured
no
yes

1010
Configure Sub-Interface with Data Isolation Context Label and Target VRF

1012
Import Next Hop Reachability Into Target VRF

1014
Import Routes For Data Isolation Context into Target VRF

1016
Advertise Route Info. with Updated Next Hop Address

SYSTEM AND METHOD FOR SUPPORTING VRF-BASED TRAFFIC ISOLATION ACROSS A NETWORK WITH DYNAMIC PROVISIONING

TECHNICAL FIELD

This disclosure relates to mechanisms for isolating network traffic to traffic isolation domains. More particularly, some embodiments relate to isolating network traffic through virtual routing and forwarding (VRF) across a network. Even more particularly, some embodiments relate to providing multi-tenancy through virtual routing and forwarding in artificial intelligence (AI) clusters.

BACKGROUND OF THE RELATED ART

Artificial intelligence (AI) is revolutionizing numerous industries. However, many organizations find it challenging to maintain their own AI infrastructures due to various practical constraints. As a result, organizations often rely on third-party, multi-tenant AI platforms that service AI needs.

A key aspect of multi-tenant systems, regardless of whether used for processing AI workloads or for other types of processing, is ensuring traffic isolation between tenants. Many networks use virtual routing and forwarding (VRF) technology to enforce traffic isolation between tenants at individual network devices.

VRF technology is an Open Systems Interconnection (OSI) model Layer 3 technology that enables the coexistence of multiple Layer 3 routing and forwarding instances (virtual routers, also referred to as VRFs) on the same physical router. Each VRF has its own interfaces (e.g., Layer 3 interfaces) and routing and forwarding tables. Thus, VRF technology allows multiple routing tables to coexist within the same router. The routing tables of VRFs on the same router can include overlapping IP address ranges.

While a VRF has local traffic isolation significance, supporting VRFs across Layer 3 networks, typically requires the use of tunneling protocols such as Multi-Protocol Label Switching (MPLS), Virtual Extensible Local Area Network (VXLAN), Internet Protocol-in-Internet Protocol (IP-in-IP), among others, that operate above Layer 2.

With the rapid expansion of AI applications, there is a growing demand for processors and network equipment capable of handling the increasingly complex computational and communication demands of AI. Consequently, specialized switching chips designed specifically for AI workloads are becoming more popular. To optimize performance and reduce switch latency, some AI workload-optimized switching chips use streamlined hardware pipelines that omit support for tunneling protocols, such as MPLS, VXLAN, IP-in-IP, and thus lack support for key technologies typically used to enforce traffic isolation in multi-tenant environments.

It is thus desired to provide a mechanism to support network traffic segregation that is compatible with the streamlined hardware pipelines of modern AI workload-optimized switching chips.

It is also desired to provide a mechanism to dynamically configure network devices for network traffic isolation.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
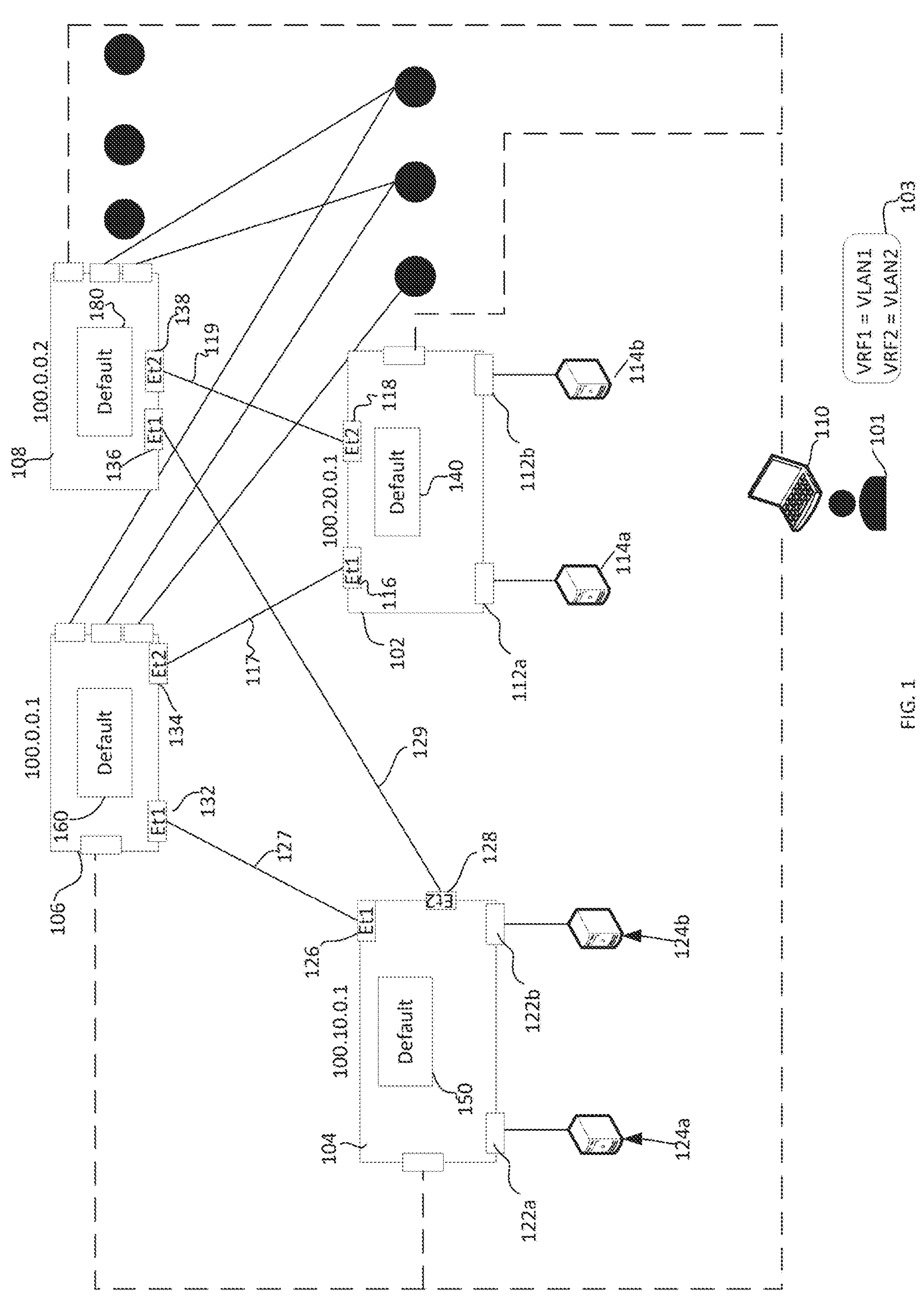
FIG. 1 is a diagrammatic representation of one embodiment of a network system.

Specific embodiments will now be described with reference to the accompanying figures (FIGS). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

The present disclosure provides mechanisms to support virtual routing and forwarding instances (VRFs) across networks. Embodiments can include dynamically configuring one or more aspects of a network device to support VRFs across a network. By way of example, but not limitation, embodiments may include dynamically provisioning VRFs, subinterfaces, or routes at network devices to support network traffic isolation across the network.

As with a physical router, a VRF typically includes a routing information base (RIB) that contains all the routing information for that VRF and forwarding information base (FIB) that is derived from the RIB to contain optimized routes. According to one embodiment, dynamically configuring a VRF includes automatically importing routes into the RIB of the VRF, which can then be used to recalculate the VRF's FIB.

One general aspect of the present disclosure includes a method for dynamically configuring network traffic isolation in a network. The method may include receiving route information from a first network device at a second network device. According to one embodiment, the route information includes an address for the first network device, a Layer 2 virtual local area network (VLAN) tag, and host reachability information. According to one embodiment, the host reachability information includes a Layer 3 address or prefix. The VLAN tag comprises a traffic isolation context label for a traffic isolation context. In some embodiments, the traffic isolation context label is a tenant identifier. The route information may be received over a network interface of the second network device. According to one embodiment, the host reachability information comprises a Layer 3 address or prefix.

The method also includes the second network device determining, based on the data isolation context label, a target VRF corresponding to the traffic isolation context. The method also includes configuring, by the second network device, a subinterface with the VLAN tag and the target VRF. The method also includes importing a reachability of the first network device into the target VRF. The method also includes importing a route into the target VRF based on the route information. According to one embodiment, the route may include the host reachability information and a next hop address, where the next hop address is the address of the first network device. Other embodiments of this aspect include corresponding network devices and computer programs configured to perform the actions of the methods.

Importing the reachability of the first network device into the target VRF may include translating the network interface to the subinterface. The route imported into the target VRF may thus include the subinterface.

Receiving the route information from the first network device at the second network device may include receiving a virtual private network (VPN) table including the route information, where the VPN table includes a field holding the traffic isolation context label (e.g., holding the VLAN tag). In one embodiment, the route information is advertised using a default VRF of the first network device and received in a default VRF of the second network device. For example, the route information may be communicated by advertising a VPN table of the first network device's default VRF.

According to one embodiment, the subinterface of the network interface of the second network device is an addressless subinterface.

The first network device may include a network interface on which a subinterface is bound to a traffic isolation context VRF of the first network device and configured with the traffic isolation context label as a VLAN tag for the subinterface.

Another general aspect includes a method for dynamically configuring network traffic isolation in a network. The method also includes exporting a host reachability information and a traffic isolation context label from a traffic isolation context VRF to the default VRF of a first network device. The traffic isolation context VRF may be configured with host reachability information and have an associated subinterface configured with a VLAN tag that comprises a traffic isolation context label. The method may further include, providing, by the first network device, route information to a second network device. The route information may include an address of the first network device as a next hop address, the host reachability information and the traffic isolation context label (e.g., the VLAN tag may be provided), where the default VRF of the first network device provides the route information to a default VRF of the second network device. Other embodiments of this aspect include corresponding network devices and computer programs configured to perform the actions of the methods.

Another general aspect of the present disclosure includes non-transitory, machine-readable medium having executable instructions to cause a processor to dynamically configure a network device, the executable instructions comprising instructions for receiving, over a network interface, route information from a next hop network device, the route information including an address for the next hop network device, a VLAN tag, and host reachability information. The VLAN tag comprises a traffic isolation context label. The non-transitory, machine-readable medium may further include executable instructions for determining a target virtual routing and forwarding instance (VRF) corresponding to the traffic isolation context. The non-transitory, machine-readable medium may further include executable instructions for configuring a subinterface of the network interface with the traffic isolation context label-for example, by configuring the subinterface with the VLAN tag-and the target VRF. The non-transitory, machine-readable medium may further include executable instructions for importing a reachability for the next hop network device into the target VRF and importing a route into the target VRF based on the route information. The route may include the host reachability information and a next hop address, where the next hop address is the address of the next hop network device. Other embodiments of this aspect include corresponding network devices configured to perform the actions of the methods.

Implementations may include one or more of the following features. The non-transitory, machine-readable medium where importing the reachability of the next hop network device into the target VRF may include translating the network interface to the subinterface, and where the route imported into the target VRF may include the subinterface. The non-transitory, machine-readable medium where receiving the route information may include receiving a VPN table including the route information. The VPN table may include a field holding the traffic isolation context label (e.g., a field holding the VLAN tag). Configuring a subinterface of the network interface with the traffic isolation context label may include configuring the subinterface with the VLAN tag. The traffic isolation context label may be a tenant identifier.

Embodiments of the present disclosure can provide a technical advantage by dynamically provisioning VRFs, subinterfaces and other aspects of network devices used for maintaining traffic isolation across a network. Dynamically provisioning various aspects of the network devices reduces the need for manual configuration by an administrator. For example, an administrator may configure one network device to isolate network traffic for a traffic isolation context, which can result in other network devices in a network dynamically configuring themselves to support the traffic isolation context across the network.

Some embodiments provide a technical advantage by supporting traffic isolation using VRFs across a Layer 3 network in a manner that does not require higher level protocols, such as MPLS, IP-in-IP, or VXLAN that operate above Layer 2. Traffic isolation is achieved, in some embodiments, using VRFs, traffic isolation context labels, and subinterface mappings.

Some embodiments provide a technical advantage by supporting advertising of route information using border gateway protocol (BGP) without requiring multiple BGP sessions per VRF in a spine or core layer.

Further, some embodiments provide a technical advantage by implementing traffic isolation without requiring the creation and management of VRF specific IP addresses (e.g., subinterface specific IP addresses for subinterfaces in a VRF), at least on links between network devices, thus reducing management overhead.

More particularly, network devices are configured with VRFs for traffic isolation contexts and can be used to achieve traffic isolation between the contexts within the network device. To further support traffic isolation across the network, the VRFs are associated with traffic isolation context labels. The traffic isolation context labels are i) inserted into tenant traffic to identify the traffic belonging to each traffic isolation context for communication to the next hop device in the network fabric; ii) are used at the next hop in the network fabric to identify which VRF to use to forward the traffic.

In one embodiment, subinterfaces are configured with the VRFs and the traffic isolation context labels (e.g., tenant labels). When traffic is forwarded using a subinterface configured with a traffic isolation context label, the subinterface inserts the traffic isolation context label into the traffic (or retains the traffic isolation context label if already included). In some embodiments, the network devices insert the traffic isolation context labels into the IEEE802.1Q field of the ethernet frames. Thus, in some embodiments, Layer 2 VLAN tags that comprise the traffic isolation context labels (e.g., the tenant labels) are inserted into the network traffic. In some embodiments, the subinterfaces are addressless subinterfaces—that is, the subinterfaces bound to the traffic isolation context VRFs (e.g., the tenant VRFs) are not assigned individual IP addresses.

When a network device receives network traffic into a VRF for a traffic isolation context or tagged with a traffic isolation context label, the network device uses the VRF associated with the traffic isolation context to forward the traffic. When forwarding packets using a VRF for a traffic isolation context to a next hop network device, the forwarding network device inserts or retains the traffic isolation context label (e.g., inserts or retains the VLAN tag) for the traffic isolation context to which the VRF belongs.

Further, in some embodiments, network devices advertise routes to adjacent network devices using BGP VPN tables. The path information for a VRF includes the traffic isolation context label as a label in a field of the BGP VPN path, even though the traffic isolation context label may be used as a Layer 2 tag. The path information may be exchanged by the default VRFs of the network devices.

A receiving network device is configured either automatically or by a user with the appropriate VRFs and subinterfaces for the traffic isolation contexts represented in the VPN tables. The routes from the VPN tables are imported into the traffic isolation context VRFs.

In a multi-tenant system, the traffic isolation contexts may, for example, correspond to the tenants. Thus, for example, network devices can be configured with different VRFs for different tenants. Further, the traffic isolation context labels, in some embodiments, are tenant identifiers—that is, identify traffic as belonging to a particular tenant. Thus, when processing a packet received into a tenant specific VRF or tagged with a tenant label, the network device inserts or retains a traffic isolation context label (e.g., inserts or retains a VLAN tag that includes the traffic isolation context label) that is unique to the tenant into the header before forwarding the packet to the next hop in the network. The traffic isolation context label travels with the traffic to ensure that network devices forward the labeled traffic using the appropriate traffic isolation context.

When a network device receives network traffic into a VRF for a tenant or tagged with a tenant label, the network device uses the VRF associated with the tenant to forward the traffic. When forwarding packets using a VRF associated with a tenant to a next hop network device, the forwarding network device inserts or retains the tenant label (e.g., inserts or retains a VLAN tag that comprises the tenant label) for the tenant with which the VRF is associated.

Embodiments according to the present disclosure may be used, for example, to isolate network traffic to, from, or between host devices (e.g., physical servers, workstations, CPUs, GPUs) provisioned to traffic isolation contexts. For example, traffic to, from, or between host devices provisioned to a tenant may be isolated from the traffic of other tenants.

FIG. 1 is a diagrammatic representation of one embodiment of a network system 100 comprising a network device 102, a network device 104, a network device 106, and a network device 108. Network system 100 is arranged as a spine and leaf topology in which network devices 102, 104 are leaf devices and network devices 106, 108 are spine (or super spine) devices. The leaf devices connect to host devices that can be provisioned to participate in workflows, such as AI workflows. As will be appreciated, there may be many host devices connected to many leaf devices connected to many spine devices. Further, there may be additional layers of devices, such as core layer or super spine devices that interconnect spine devices.

Each of the network devices 102, 104, 106, 108 is a switch, router or other network device having a plurality of network interfaces and that supports VRF and subinterfaces. A device management computer 110 is connected to one or more of the network devices such that an administrator 101 or another user with sufficient privileges can access a console on device management computer 110 to configure one or more of the network devices.

Network device 102 includes ethernet interfaces 112*a*, 112*b* that connect to links to host devices 114*a*, 114*b* an ethernet interface 116 (Et1) that connects to link 117 and ethernet interface 118 (Et2) that connects to link 119. Network device 104 includes ethernet interfaces 122*a*, 122*b* that connect to links to host devices 124*a*, 124*b*, an ethernet interface 126 (Et1) that connects to link 127 and ethernet interface 128 (Et2) that connects to link 129. Network device 106 includes ethernet interface 132 (Et1) that connects to link 127 and ethernet interface 134 (Et2) that connects to link 117. Network device 108 includes ethernet interface 136 (Et1) that connects to link 129 and ethernet interface 138 (Et2) that connects to link 119. Each of the network devices can include additional interfaces to connect to links to other network devices, host devices, or device management computer 110.

Further as depicted, interface 116 and interface 118 of network device 102 have the address 100.20.0.1, interface 126 and interface 128 of network device 104 have the address 100.10.0.1, interface 132, interface 134, and the other interfaces of network device 106 that connect to leaf nodes have the address 100.0.0.1, and interface 136 and interface 138 of network device 108 have the address 100.0.0.2.

As illustrated in FIG. 1, network device 102 includes default VRF 140, network device 104 includes default VRF 150, network device 106 includes default VRF 160 and network device 108 includes default VRF 180. In some embodiments, the Layer 3 interfaces of a network device are assigned to the default VRF until they are assigned to other VRFs. The default VRF includes the default routing and forwarding tables for traffic that is not handled by another VRF of the network device.

The network devices of network system 100 are configurable to isolate traffic according to traffic isolation contexts. In some embodiments, configuring the network devices comprises configuring VRFs for the traffic isolation contexts and configuring subinterfaces with the VRFs and traffic isolation context labels. The configuration process can be made more efficient by using a defined naming convention for VRFs, traffic isolation context labels, and subinterfaces. In one embodiment, for example, the VRF name, route designator (RD) assigned to a VRF, route target assigned to a VRF, the traffic isolation context label, and subinterface identifier associated with a traffic isolation context all comprise a common identifier (e.g., tenant identifier). Thus, for example, if tenant 1 is assigned the identifier "1", the VRF at each network device corresponding to tenant 1 may be named VRF1. Further, the RD and RT of the paths exported by the egress VRF1 may also indicate the traffic isolation context. For example, the paths exported by VRF1 at an egress network device may include RD1 and RT1. Similarly, the VLAN tag for tenant 1 may be VLAN1, and the subinterfaces of each main interface assigned to VRF1 may have a 0.1 designator (e.g., for a network device with three main interfaces Et1, Et2, Et3, the subinterfaces associated with VRF1 and VLAN1 are Et1.1, Et2.1, Et3.1).

According to one embodiment, mapping 103 is established between VRFs and traffic isolation context labels and is used to guide configuration of network devices. In FIG. 1, mapping 103 maps VRF names to VLAN tags (only two VRF names and VLAN tags are included in map 103 for simplicity of example). Further, while "VLAN1" and "VLAN2" are used as examples for the sake of explanation, it will be appreciated that the tags may have various forms. For example, in one embodiment, each of the "VLAN1" and "VLAN2" labels are 12-bit values compatible with the IEEE 802.1Q field of an ethernet frame and at least a portion of the 12-bits is used as a traffic isolation context label Thus, a VLAN tag may comprise a traffic isolation context label (i.e., all or a portion of a VLAN tag may serve as a data isolation context label).

In some embodiments, mapping 103 is used by the administrator during configuration. In addition, or in the alternative, administrator 101 may configure mapping 103 on the network devices 102, 104, 106, 108. The network devices can use mapping 103 in various stages of dynamic configuration (e.g., to dynamically create or configure VRFs or subinterfaces).

Figures 2, 3:
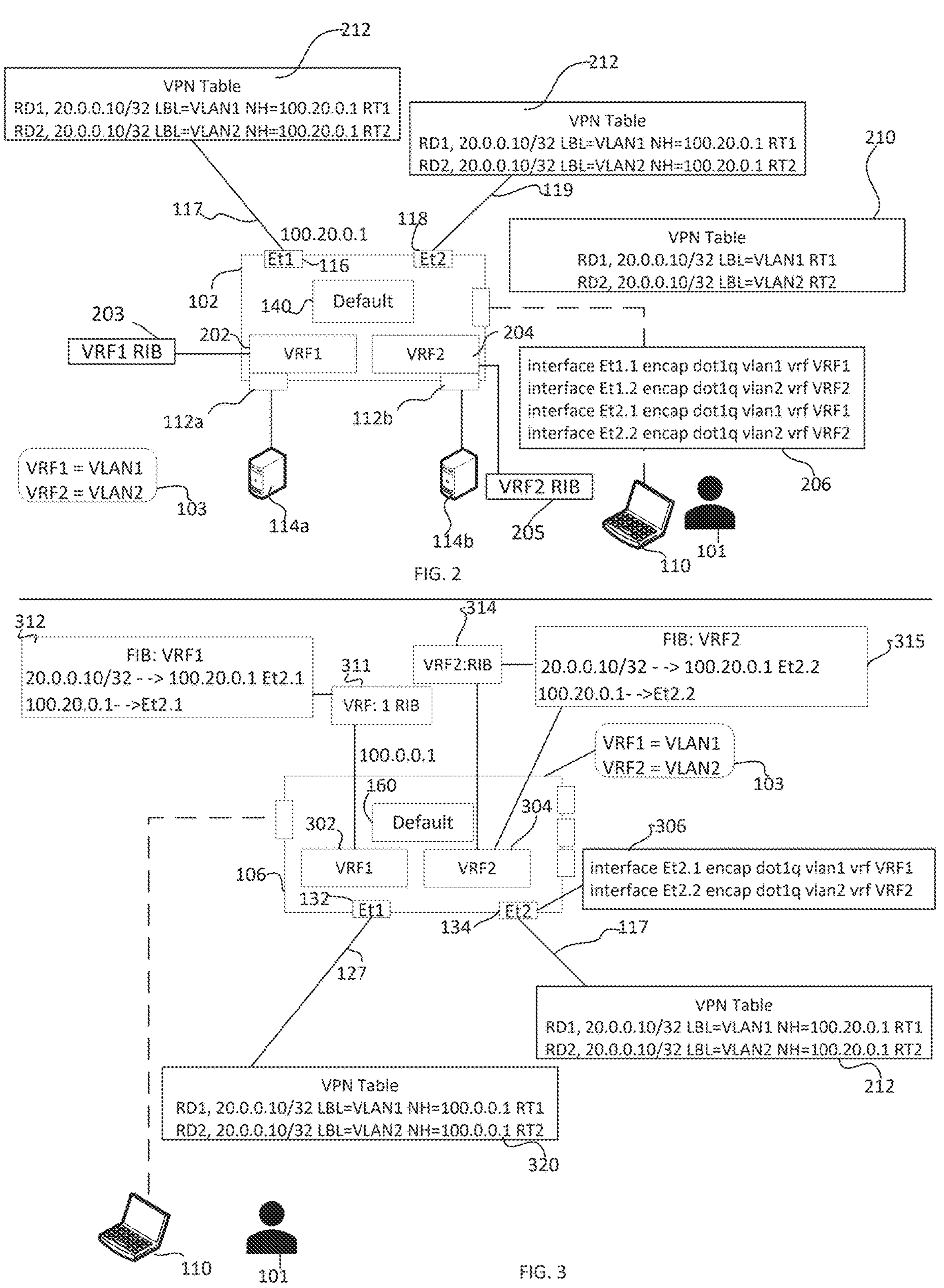
FIG. 2 is a diagrammatic representation of one embodiment configuring an egress network device for isolating network data according to traffic isolation contexts.
FIG. 3 is a diagrammatic representation of one embodiment configuring an intermediate hop network device for isolating network data according to traffic isolation contexts.

Turning to FIG. 2, one embodiment of configuring network device 102 to isolate traffic according to traffic isolation contexts is illustrated. According to one embodiment, VRFs for traffic isolation contexts are created on egress network devices (e.g., egress leaf devices) connected to the host devices that act as destinations for traffic isolation context traffic. In this example, network device 102 is the egress network device 102 for data destined to host devices 114*a*, 114*b*. In the example of FIG. 2, administrator 101 configures network device 102 with VRF 202 ("VRF1") and VRF 204 ("VRF2") to isolate traffic to host device 114*a* from traffic to host device 114*b*.

To create a VRF an administrator typically provides VRF configuration information including a VRF name; The VRF configuration information may also include other information such as a route designator (RD) to the VRF. The administrator further binds the interfaces or subinterfaces over which the network device connects to those host devices to the VRF. Further, the host addresses of the hosts provisioned to a VRF are stored in the RIB of the VRF (e.g., RIB 203 of VRF 202, RIB 205 of VRF 204).

In some embodiments, administrator 101 may configure each network device that will handle traffic for a traffic isolation context with a VRF for the traffic isolation context. For example, administrator 101 may also create a VRF1 and VRF2 on each of network device 104, network device 106, and network device 108. In other embodiments, a dynamic provisioning process creates VRF1 and VRF2 on the other network devices.

Further, subinterfaces may be configured on one or more network interfaces for the traffic isolation contexts. In FIG. 2, for example, subinterface configuration 206 configures subinterfaces on the main interfaces Et1 and Et2 of network device 102. Here, a first subinterface Et1.1 of main interface Et1 and a first subinterface Et2.1 of main interface Et2 are configured with VRF1 and the traffic isolation context label VLAN1. Similarly, a second subinterface Et1.2 of main interface Et1and a second subinterface Et 2.2 of main interface Et2 are configured with VRF2 and the traffic isolation context label VLAN2. In this example, subinterface Et1.1 and subinterface Et2.1 are included as interfaces of VRF 202 (VRF1). Similarly, subinterface Et1.2 and subinterface Et2.2 are included as interfaces of VRF 204 (VRF2).

In some embodiments, the configuration of the subinterfaces may be done dynamically based on the creation of the traffic isolation context VRFs or based on another trigger event, such as, on receiving a BGP update message. For example, using mapping 103, rules or other mechanisms, network device 102 can automatically configure subinterfaces based on the VRF configuration information for VRF 202 and VRF 204. In other embodiments, the administrator configures the subinterfaces of network device 102. In some embodiments, the subinterfaces Et1.1, Et1.2, Et2.1 and Et2.2 are addressless subinterfaces in that they are not assigned individual IP addresses.

According to one embodiment, routes with traffic isolation context labels are leaked from each traffic isolation context VRF of network device 102 to the default VRF. Thus, for example, route information is exported from VRF 202 and VRF 204 to VRF 140. The exported routes may include information such as a route designator (RD) and a route target (RT). The RD or RT may, in some embodiments, identify the traffic isolation context (e.g., include a tenant identifier or other information usable to identify a traffic isolation context). As will be appreciated, the export process may append a route target (RT) to each exported path based, for example, on the VRF that exported the path.

According to one embodiment, default VRF 140 stores the exported routes in a BGP VPN table 210. Continuing with the example in which the egress leaf device is configured with VRF1 and VRF2, each having a host device with the address 20.0.0.10/32, the VPN table 210 may comprise the following information for the routes exported from VRF1 and VRF2:

RD1, 0.0.0.10/32 LBL=VLAN1 RT1

RD2, 20.0.0.10/32 LBL=VLAN2 RT2

In this example, the label field of the VPN table carries the traffic isolation context label (e.g., VLAN tag).

Default VRF 140 of network device 102 advertises the route information over Et1 and Et2, which have an IP address 100.20.0.1. For example, default VRF of network device may advertise VPN table 212 to adjacent network devices over Et1 and Et2, where VPN table 212 includes:

RD1, 20.0.0.10/32 LBL=VLAN1 NH=100.20.0.1 RT1

RD2, 20.0.0.10/32 LBL=VLAN2 NH=100.20.0.1 RT2

The route information in this example includes the address for the first network device, a traffic isolation context label for a traffic isolation context, and host reachability information. The host reachability information, according to one embodiment, comprises a Layer 3 address or prefix.

According to one embodiment, the default VRF 140 establishes sessions with the default VRFs of potential prior hop network devices to exchange route information. For example, with reference to FIG. 1, default VRF 140 establishes BGP sessions with default VRF 160 of network device 106 and default VRF 180 of network device 108 to exchange route information (e.g., to provide VPN table 212).

Turning to FIG. 3, a diagrammatic representation of one embodiment of configuring a prior hop network device is illustrated. More particularly, FIG. 3 illustrates an example of configuring network device 106.

Default VRF 160 receives VPN table 212 from network device 102 over interface 134 (here, Et2). In this case, the routes received from network device 102 are for forwarding traffic to network device 102 as a next hop device and, as such, interface 134 may be considered an egress interface of network device 106 with respect to the routes of VPN table 212.

According to one embodiment, if network device 106 does not already have a target VRF for a traffic isolation context label in a received VPN table, network device 106 automatically creates the VRF. Creation of a VRF for a traffic isolation context label is straightforward as, at this point, each VRF only needs a minimum amount of configuration information. Thus, for example, when network device 106 receives VPN table 212, network device 106 may automatically create VRF 302 ("VRF1") and VRF 304 ("VRF2") for VLAN1 and VLAN2, respectively (e.g., according to mapping 103). In other embodiments, administrator 101 creates the VRFs beforehand. Further, network device 106 may configure the VRFs with the respective RDs from VPN table 212.

Further, if a subinterface on the egress main interface for the received route information is not configured for the traffic isolation context, network device 106 configures the subinterfaces. In the example of FIG. 3, subinterfaces Et2.1 and Et2.2 of Et2 are configured as illustrated in subinterface configuration 306. Thus, subinterface Et2.1 is bound to VRF 302 (VRF1) and configured with the VLAN tag VLAN1 and subinterface 2.2 is bound to VRF 304 (VRF2) and bound to VLAN tag VLAN2. In other embodiments, administrator 101 may configure the subinterfaces.

The device reachability of network device 102 is imported from default VRF 160 into the target VRFs. More particularly, the reachability information is imported into the RIBs of the target VRFs. According to one embodiment, this includes translating the interface from the main interface over which the route information was received to the subinterface for the traffic isolation context. For example, the reachability information of 100.20.0.1-->Et2 is translated to 100.20.0.1-->Et2.1 for VRF 302 (VRF1) and 100.20.0.1-->Et2.2 for VRF 304 (VRF2).

Default VRF 160 of network device 106 imports reachability information into the RIBs of the VRFs based, for example, on a correspondence between the traffic isolation context label or route target (RT) and the VRF. For example, RIB 311 of VRF 302 is updated with the reachability information associated with VLAN1 and RIB 314 of VRF 304 is updated with the reachability information associated with VLAN 2. According to one embodiment, the updates to the RIBs include the appropriate egress subinterface for the main interface connected to the link to the next hop network device.

Thus, the forwarding information of VRF 302 and VRF 304 can be updated to specify where next hops are resolved for the imported paths. For example, the forwarding information base (FIB) 312 (e.g., the forwarding table) of VRF 302 is updated to include:

100.20.0.1-->Et2.1

Similarly, FIB 314 of VRF 304 is updated to include:

100.20.0.1-->Et2.2

The updates to the FIBs can also include the appropriate egress subinterface for the main interface connected to the link to the next hop network device. Thus, for example, FIB 312 of VRF 302 is updated to include:

20.0.0.10/32-->100.20.0.1 Et2.1.

Similarly, FIB 314 of VRF 304 is updated to include:

20.0.0.10/32-->100.20.0.1 Et2.2.

Default VRF 160 of network device 106 advertises the VRF routes to adjacent network devices over potential ingress interfaces for the routes using the address of the potential ingress interface as the next hop address. For example, default VRF 160 may advertise VPN table 320 to default VRF 150 of network device 104 (FIG. 1).

Figure 4:
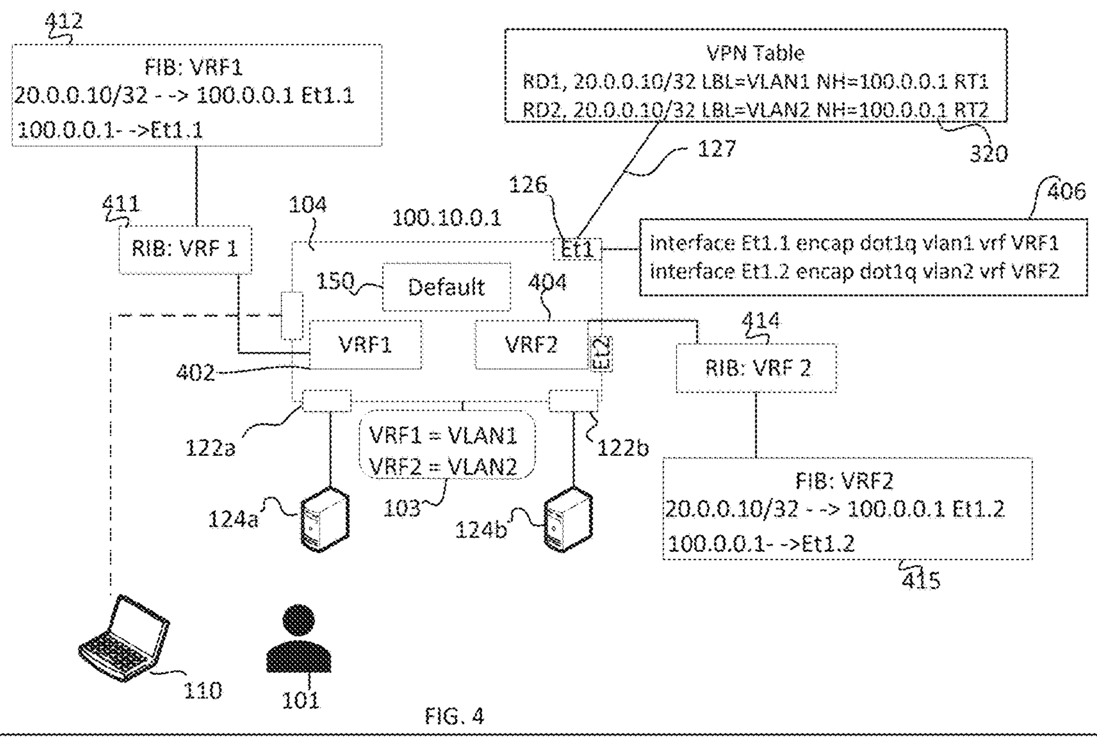
FIG. 4 is a diagrammatic representation of one embodiment of configuring an ingress network device for isolating network data according to traffic isolation contexts.

Turning to FIG. 4, a diagrammatic representation of another embodiment of configuring a prior hop network device is illustrated. More particularly, FIG. 4 illustrates an example of configuring network device 104.

Default VRF 150 receives VPN table 320 from network device 106 over interface 126 (here, Et1). In this case, the routes received from network device 106 are for forwarding traffic to network device 106 as a next hop device and, as such, interface 126 is an egress interface of network device 104 with respect to the routes of VPN table 320.

According to one embodiment, if network device 104 does not already have a VRF for a traffic isolation context label in a received VPN label, network device 104 automatically creates the VRF (e.g., according to mapping 103). Thus, when network device 104 receives VPN table 320, network device 104 automatically creates VRF 402 ("VRF1") and VRF 404 ("VRF2") for VLAN1 and VLAN2, respectively. In other embodiments, administrator 101 creates the VRFs beforehand.

Further, if a subinterface on the egress main interface for the received route information is not configured for the traffic isolation context, the subinterface is configured. In the example of FIG. 4, subinterfaces 1.1 and 1.2 of Et1 (ethernet interface 126) are configured as illustrated in subinterface configuration 406. Thus, subinterface 1.1 is bound to VRF 402 (VRF1) and configured with the VLAN tag VLAN1 and subinterface 1.2 is bound to VRF 404 (VRF2) and bound to VLAN tag VLAN2. In other embodiments, administrator 101 configures these subinterfaces.

The device reachability of network device 106 is imported from default VRF 150 into the target VRFs. More particularly, the reachability information is imported into the RIBs of the target VRFs. According to one embodiment, this includes translating the interface from the main interface over which the route information was received to the subinterface for the VRF (e.g., to the subinterface for the VRFs VLAN). For example, the reachability information of 100.0.0.1-->Et1 is translated to 100.0.0.1-->Et1.1 for VRF 402 (VRF1) and 100.0.0.1-->Et1.2 for VRF 404 (VRF2).

Default VRF 150 of network device 104 imports reachability information into the RIBs of the VRFs based, for example, on a correspondence between the traffic isolation context label or route target (RT) and the VRF. Thus, reachability information associated with VLAN 1 is imported into RIB 411 of VRF 402 and the device reachability information associated with VLAN 2 is imported into RIB 414 of VRF 404. According to one embodiment, updates to the RIBs include the appropriate egress subinterface for the main interface connected to the link to the next hop network device.

Thus, the forwarding information base of VRF 402 and the forwarding information base of VRF 404 can be updated to specify where next hops are resolved for imported paths. For example, FIB 412 of VRF 402 is updated to include:

100.0.0.1-->Et1.1

Similarly, FIB 415 of VRF 404 is updated to include:

100.0.0.1-->Et1.2

The updates to the FIBs can include the appropriate egress subinterface for the main interface connected to the link to the next hop network device. Thus, for example, FIB 412 of VRF 402 is updated to include:

20.0.0.10/32-->100.0.0.1 Et1.1.

Similarly, FIB 415 of VRF 404 is updated to include:

20.0.0.10/32-->100.0.0.1 Et1.2.

Default VRF 150 of network device 104 advertises the VRF routes to adjacent network devices over potential ingress interfaces for the routes using the address of the potential ingress interface as the next hop address. For example, default VRF 150 may advertise a VPN table over Et2.

Returning briefly to FIG. 1 and FIG. 2, network device 102 provides VPN table 212 to network device 108. Thus, network device 108 can further propagate the route information for forwarding traffic to VRF 202 and VRF 204. The process can be repeated until the routes from network device 102 are propagated throughout network system 100.

Figure 5:
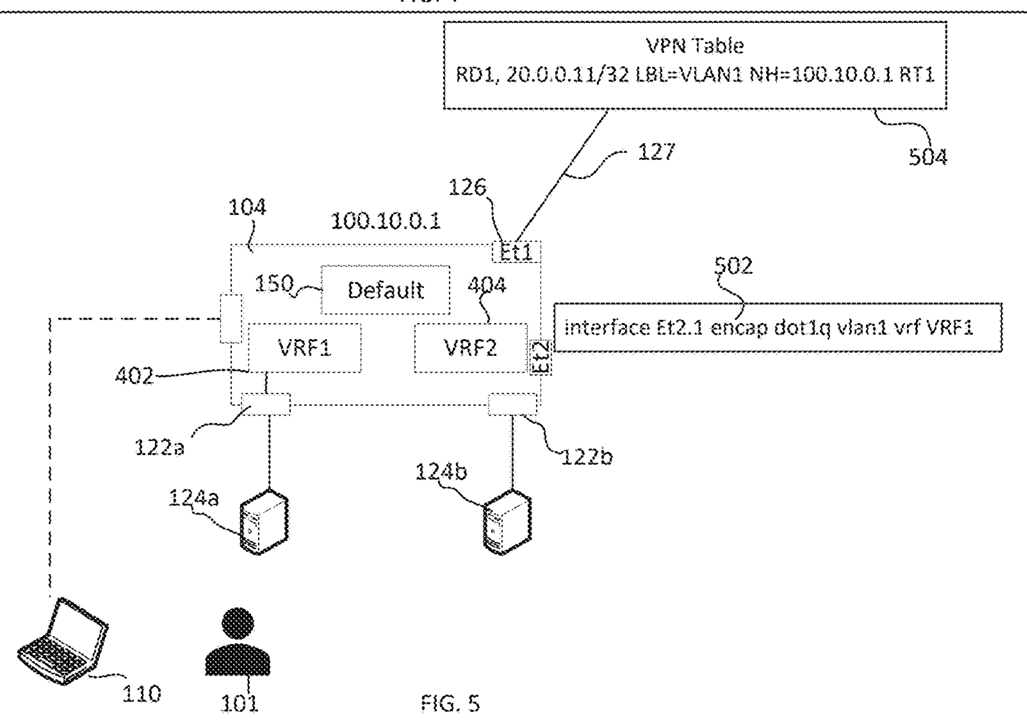
FIG. 5 is a diagrammatic representation of an embodiment of configuring an ingress network device to add a host to a data isolation context.

FIG. 5 is a diagrammatic representation of adding a host to a VRF at a network device. Here, administrator 101 adds host device 124*a* to VRF 402 ("VRF1") of network device 104. A subinterface Et1.1 is already bound to VRF1 (FIG. 4). If not already configured, a subinterface Et2.1 is configured as shown in subinterface configuration 502.

The updated route information is exported to default VRF 150 and default VRF 150 advertises the route information (e.g., VPN table 504) to network device 106 and network device 108 (only the updated information is illustrated).

Figure 6:
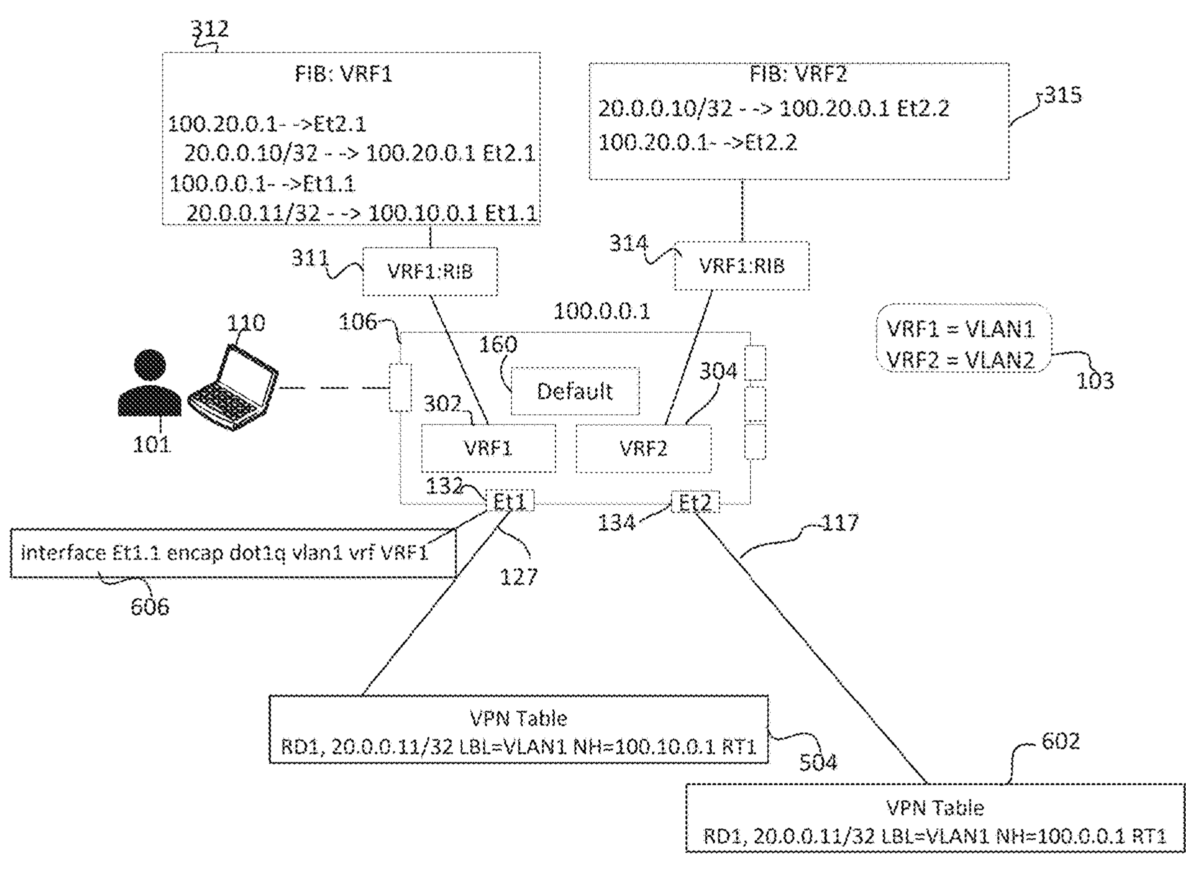
FIG. 6 is a diagrammatic representation of another embodiment of configuring an intermediate hop network device.

Turning to FIG. 6, a diagrammatic representation of one embodiment of configuring a prior hop network device is illustrated. More particularly, FIG. 6 illustrates an example of configuring network device 106.

Default VRF 160 receives VPN table 504 from network device 104 over interface 132 (here, Et1). In this case, the routes received from network device 104 are for forwarding traffic to network device 104 as a next hop device and, as such, interface 132 may be considered an egress interface of network device 106 with respect to the routes of VPN table 504.

If a subinterface on the egress main interface for the received route information is not configured for the traffic isolation context, the subinterface is configured. In the example of FIG. 6, network device 106 configures subinterface Et1.1 as illustrated in subinterface configuration 606. Thus, subinterface Et1.1 is bound to VRF 302 (VRF1) and configured with the VLAN tag VLAN1. In other embodiments, administrator 101 may configure the subinterfaces.

The device reachability of network device 104 is imported from default VRF 160 into VRF 302 based, for example, on a correspondence between the traffic isolation context label or route target (RT) and the VRF. According to one embodiment, this includes translating the interface from the main interface over which the route information was received to the subinterface for the VRF (e.g., to the subinterface for the VRFs VLAN). For example, the reachability information of 100.10.0.1-->Et1 is translated to 100.10.0.1-->Et1.1 for VRF 302 (VRF1).

Thus, the forwarding information of VRF 302 can be updated to specify where next hops are resolved for imported paths. For example, FIB 312 of VRF 302 is updated to include:

100.10.0.1-->Et1.1

The updates to the FIBs include the appropriate egress subinterface for the main interface connected to the link to the next hop network device. Thus, for example, FIB 312 of VRF 302 is updated to include:

20.0.0.11/32-->100.10.0.1 Et1.1.

Default VRF 160 of network device 106 advertises the VRF routes to adjacent network devices over potential ingress interfaces for the routes using the address of the potential ingress interface as the next hop address. For example, default VRF 160 may advertise VPN table 602 to default VRF 140 of network device 102 (FIG. 1).

Figure 7:
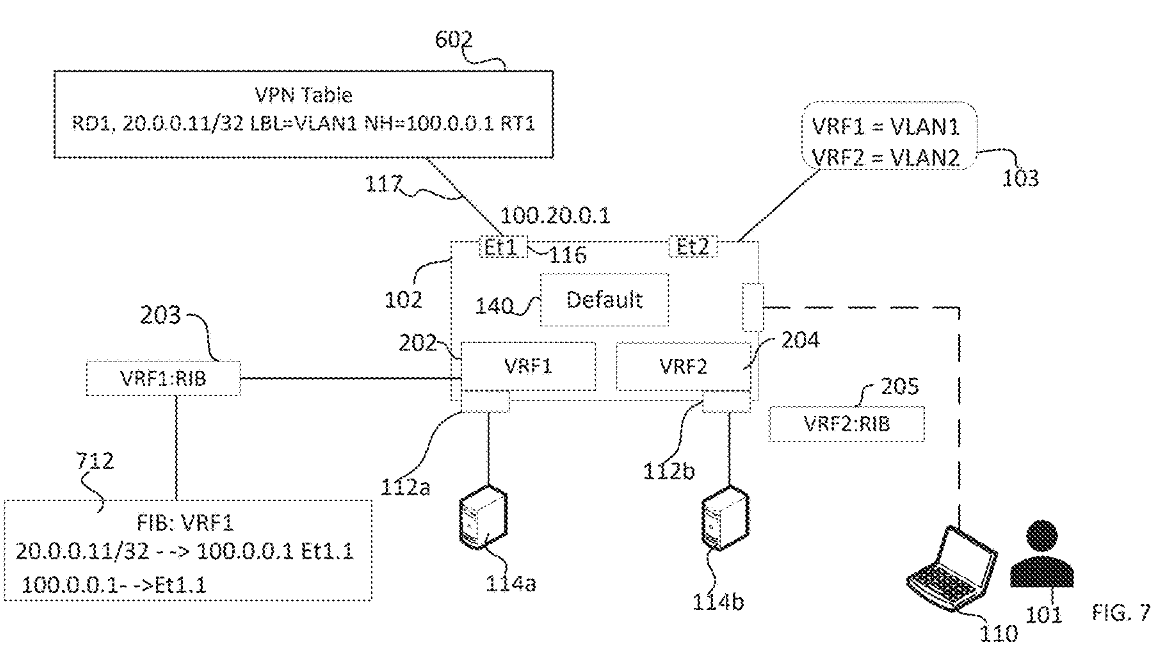
FIG. 7 is a diagrammatic representation of another embodiment of configuring an ingress network device with routing information for a data isolation context received from another device.

Turning to FIG. 7, a diagrammatic representation of another embodiment of configuring a prior hop network device is illustrated. More particularly, FIG. 7 illustrates an example of configuring network device 102.

Default VRF 140 receives VPN table 602 from network device 106 over interface 116 (here, Et1). In this case, the routes received from network device 106 are for forwarding traffic to network device 106 as a next hop device and, as such, interface 116 is an egress interface of network device 102 with respect to the routes of VPN table 602.

Here, VRF 202 (VRF1) and Et1.1 are already configured for the traffic isolation context indicated by the VLAN1 tag. The device reachability of network device 106 is imported from default VRF 140 into VRF 202 (VRF1) based, for example, on the correspondence between the traffic isolation context label or route target (RT) and the VRF. More particularly, the reachability information is imported into RIB 203. According to one embodiment, this includes translating the interface from the main interface over which the route information was received to the subinterface for the VRF (e.g., to the subinterface for the VRFs VLAN). For example, the reachability information of 100.0.0.1-->Et1 is translated to 100.0.0.1-->Et1.1 for VRF 202 (VRF1).

Thus, FIB 712 of VRF 202 can be updated to specify where next hops are resolved for the imported paths. For example, FIB 712 of VRF 202 is updated to include:

100.0.0.1-->Et1.1

The updates to the forwarding tables include the appropriate egress subinterface for the main interface connected to the link to the next hop network device for the imported routes. Thus, for example, FIB 712 of VRF 202 is updated to include:

20.0.0.11/32-->100.0.0.1 Et1.1.

Thus, a route of host device 124*a* as a destination host device for host device 114*a* as a source host device and vice versa is established.

It can be noted that in the description of FIGS. 3-7, subinterfaces are configured on the egress interfaces for a route. In other embodiments, subinterfaces may also be established on potential ingress interfaces for the routes. For example, when network device 106 receives VPN table 212 from network device 102, network device 106 may also configure subinterfaces on potential ingress interface 132 (e.g., create Et1.1 and Et1.2).

In operation, when an ingress network device (e.g., an ingress leaf device) receives network traffic into a VRF associated with a traffic isolation context, the network device uses the VRF to forward the traffic. For example, if network device 104 receives traffic from host device 124*a* with a destination of 20.0.0.10, assuming host device 124*a* is provisioned to VRF 402 (VRF1) (FIG. 5), network device 104 uses forwarding table 412 (FIG. 4) of VRF 402 to determine that the next hop is 100.0.0.1 reachable on Et1.1. Thus, network device 104 forwards the traffic to 100.0.0.1 on link 127 using Et1.1. Because Et1.1 is configured with the VLAN1 tag, Et1.1 inserts the VLAN1 tag into the traffic.

The traffic is received via Et1 of network device 106. Because the traffic is tagged as VLAN1, network device 106 processes the traffic using Et1.1, which is bound to VRF 302 (VRF1). As such, network device 106 uses VRF 302 to forward the traffic. Thus, network device 106 identifies the next hop as 100.20.0.1 reachable over Et2.1 from forwarding table 312 and forwards the traffic using Et2.1. Because Et2.1 is configured with the VLAN1 tag, Et2.1 retains the VLAN1 tag previously inserted in the network traffic and forwards the traffic to 100.20.0.1 on link 117.

Network device 102 receives the traffic on link 117. Because the traffic is tagged as VLAN1, network device 106 processes the traffic using Et1.1, which is bound to VRF 202 (VRF1). As such, network device 102 uses VRF 202 to forward the traffic to host device 114*a*.

Figure 8:
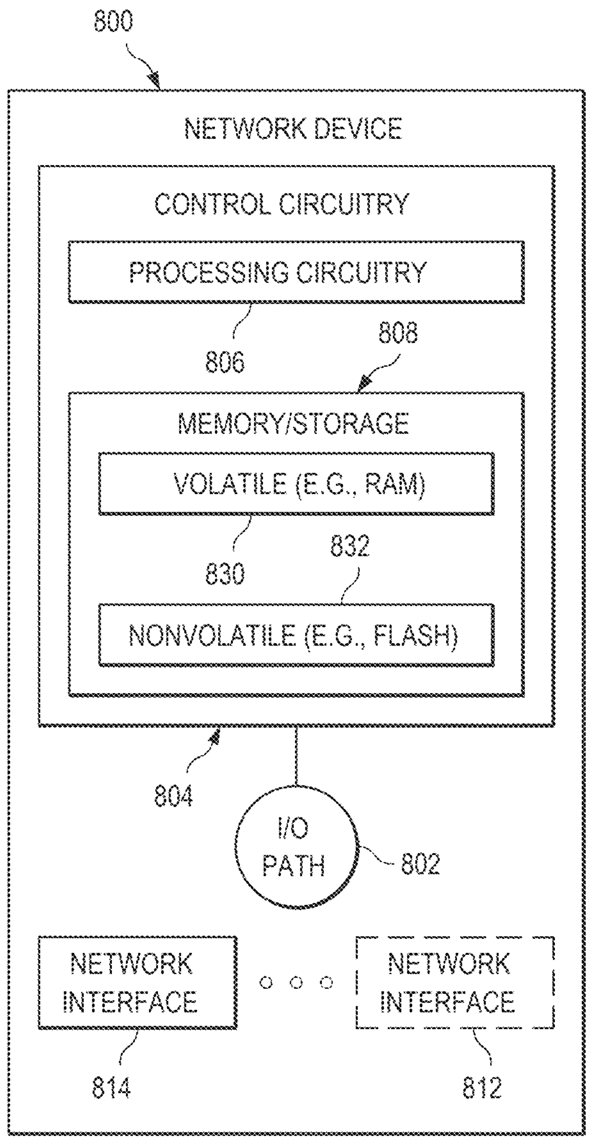
FIG. 8 is a diagrammatic representation of one embodiment of configuring a network device for a data isolation context and propagating routing information to other devices.

FIG. 8 depicts a diagrammatic representation of an example architecture of a network device 800 according to some embodiments disclosed herein. Network device 800 may receive data via an input/output (I/O) path 802. I/O path 802 provides packet data to a control circuitry 804, which includes a processing circuitry 806 and a storage 808 (i.e., memory). Control circuitry 804 may send and receive commands, requests, and other suitable data using the I/O path 802. In turn, I/O path 802 connects the control circuitry 804 (and specifically processing circuitry 806) to one or more network interfaces 812, to which other devices can be connected. These network interfaces may be any type of network interface, such as an RJ45 ethernet port, a coaxial port, etc.

Control circuitry 804 includes processing circuitry 806 and storage 808. As referred to herein, the term "processing circuitry" should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). Processing circuitry 806 can be distributed across multiple separate processors or processing units, for example, multiple of the same type or multiple types. The circuitry described herein may execute instructions included in software running on one or more general purpose or specialized processors.

Storage 808 comprises an electronic storage device. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same. Other implementations may also be possible. In particular, storage 808 includes a volatile RAM 830, which does not retain its contents when power is turned off, and a nonvolatile RAM 832, which does retain its contents when power is turned off. Storage 808, according to one embodiment, includes a non-transitory, machine-readable medium storing executable instructions that are executable by control circuitry 804.

Figures 9, 10:
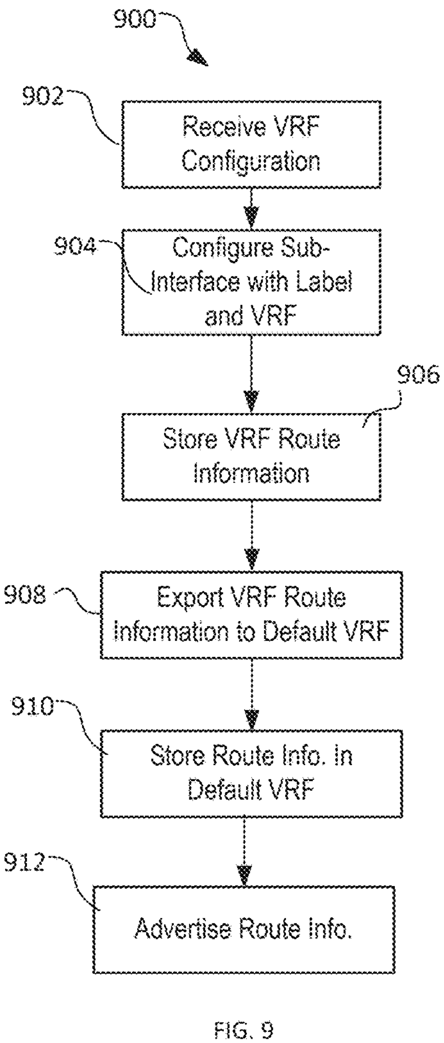
FIG. 9 is a flow chart illustrating one embodiment of configuring a network device based on routing information received from another network device.
FIG. 10 is a flow chart illustrating one embodiment of a method for configuring a network device to isolate network traffic according to traffic isolation contexts.

FIG. 9 is a flow chart of one embodiment of a method 900 for configuring a network device to isolate network traffic according to traffic isolation contexts. One or more steps of method 900 may be implemented by physical or virtual control circuitry, such as control circuitry 804 of device 800 (FIG. 8). One or more steps may be implemented through executable instructions on a non-transitory, machine-readable medium.

At step 902, a network device receives a VRF configuration for a traffic isolation context VRF, including host address information for hosts provisioned to the VRF (e.g., an address for an individual host device or addresses for multiple host devices). The VRF configuration, in some embodiments, includes a route designator (RD).

At step 904, the network device automatically configures a subinterface with a traffic isolation context label and the traffic isolation context VRF. For example, the network device may configure an ethernet subinterface with a VLAN tag for a traffic isolation context and the VRF. The subinterface may be an addressless subinterface. In another embodiment, the network device receives the subinterface configuration from an administrator. At step 906, the host address information, traffic isolation context label and RD are stored in the traffic isolation context VRF, such as in a RIB of the VRF.

At step 908, the network device exports the VRF route information, including the host address information, the traffic isolation context label, and RD from the traffic isolation context VRF to a default VRF of the network device. The export process may append a route target (RT) to the route information. In some embodiments, the value of the route target is based on the traffic isolation context of the VRF from which the route information is exported.

The default VRF stores the route information from the traffic isolation context VRF in a BGP VPN table, using a field of the VPN table to hold the traffic isolation context label (step 910). In one embodiment, for example, the default VRF stores the traffic isolation context label in the label field of the VPN table.

At step 912, the default VRF advertises route information to an adjacent network device. For example, the default VPN advertises a VPN table to the default VRF of an adjacent network device.

FIG. 9 is merely provided as an illustrative example. Embodiments may, for example, perform the steps in different orders, omit steps, repeat steps, or perform alternative steps.

FIG. 10 is a flow chart of another embodiment of a method 1000 for configuring a network device to isolate network traffic according to traffic isolation contexts. One or more steps of method 1000 may be implemented by physical or virtual control circuitry, such as control circuitry 804 of device 800 (FIG. 8). One or more steps may be implemented through executable instructions on a non-transitory, machine-readable medium.

At step 1002, the network device receives into the default VRF, route information for one or more traffic isolation contexts from a next hop network device. According to one embodiment, the route information for a traffic isolation context includes host device information (e.g., an address for an individual host device or addresses for multiple host devices), a traffic isolation context label for the route information, an RD and an RT. The route information may also include the address of the next hop network device. In one embodiment, the network device receives a BGP VPN table including the route information for the one or more traffic isolation contexts with a field of the BGP VPN table repurposed to hold the traffic isolation context labels.

At step 1004, the network device determines if a target VRF corresponding to a traffic isolation context represented in the route information exists at the network device. In some embodiments, the network device determines if a VRF with a name that maps to the traffic isolation context label is configured at the network device (e.g., using a defined mapping, such as mapping 103, or other mechanism). Step 1004 may be performed for each unique traffic isolation context represented in the route information (e.g., for each unique traffic isolation context label from the route information). If the target VRF does not exist for a traffic isolation context at the network device, the network device creates the target VRF for the traffic isolation context (step 1006). In other embodiments, the network device may take other actions if the target VRF does not exist at the network device, such as entering error handling, sending a notification to an administrator, or taking another predefined action. Step 1006 may be performed for each unique traffic isolation context represented in the route information for which a target VRF does not exist at the network device.

In another embodiment, an administrator configures the VRFs for the traffic isolation contexts on the network device prior to the network device receiving the route information.

At step 1008, the network device determines if a subinterface corresponding to a traffic isolation context represented in the route information is configured on the main interface over which the route information was received. Step 1008 may be performed for each unique traffic isolation context represented in the route information (e.g., for each unique traffic isolation context label from the route information). If a subinterface is not configured for a traffic isolation context represented in the route information, the network device configures a subinterface for the traffic isolation context (step 1010). According to one embodiment, the subinterface is configured with the traffic isolation context label of the traffic isolation context and the VRF for the traffic isolation context. In one embodiment, the traffic isolation context label is set as a VLAN tag—for example, a layer 2 VLAN tag—for the subinterface. Step 1010 may be performed for each unique traffic isolation context in the route information for which a subinterface of the main interface is not configured. The network device may also configure subinterfaces corresponding to the traffic isolation contexts on other main interfaces of the network device.

In another embodiment, an administrator configures the subinterfaces on the network device prior to the network device receiving the route information. The subinterfaces, whether configured dynamically or by an administrator, are addressless subinterfaces in some embodiments.

At step 1012, the network device imports the reachability of the next hop network device from the default VRF into a target VRF. According to one embodiment, this includes translating the interface from the main interface over which the route information was received to the subinterface for a traffic isolation context and updating the RIB and FIB of the target VRF for the traffic isolation context with the translated reachability information.

At step 1014, the network device imports the routes corresponding to a traffic isolation context into the target VRF for the traffic isolation context including updating the RIB and the FIB of the target VRF. The update to the RIB and FIB can include the appropriate subinterface from the translated reachability information for the traffic isolation context. Steps 1012 and 1014 may be repeated for each unique traffic isolation context represented in the route information.

At step 1016, the network device, using the default VRF, advertises the VRF route information is advertised to adjacent network devices over potential ingress interfaces for the routes using the address of the potential ingress interface as the next hop address for the routes.

FIG. 10 is merely provided as an illustrative example. Embodiments may, for example, perform the steps in different orders, omit steps, repeat steps, or perform alternative steps.

In this disclosure, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for virtual routing and forwarding support across a network with dynamic provisioning, the method comprising:

receiving route information from a first network device at a second network device, the route information including an address for the first network device, a virtual local area network (VLAN) tag, and host reachability information, the VLAN tag comprising a traffic isolation context label, wherein the route information is received over a network interface of the second network device;

determining, by the second network device and based traffic isolation context label, a target virtual routing and forwarding instance (VRF) corresponding to the traffic isolation context at the second network device;

configuring, by the second network device, a subinterface of the network interface of the second network device with the VLAN tag and the target VRF;

importing a reachability of the first network device into the target VRF; and importing a route into the target VRF based on the route information, the route comprising the host reachability information and a next hop address, wherein the next hop address is the address of the first network device, wherein receiving the route information from the first network device at the second network device comprises receiving a virtual private network (VPN) table that holds the VLAN tag for the subinterface such that receiving the VLAN tag in the VPN table triggers automatic configuration of the subinterface with the traffic isolation context corresponding to the target VRF on the network interface over which the VPN table is received.

2. The method of claim 1, wherein importing the reachability of the first network device into the target VRF comprises translating the network interface to the subinterface.

3. The method of claim 2, wherein the route imported into the target VRF comprises the subinterface.

4. The method of claim 1, further wherein the VLAN tag is extracted from the VPN table and used to configure the subinterface.

5. The method of claim 1, wherein the route information is received using a default VRF of the second network device from a default VRF of the first network device.

6. The method of claim 1, wherein the subinterface of the network interface of the second network device is an addressless subinterface.

7. The method of claim 1, wherein the first network device comprises a network interface on which a subinterface is bound to a traffic isolation context VRF of the first network device and configured with the VLAN tag.

8. The method of claim 7, further comprising:

exporting the host reachability information and the traffic isolation context label from the traffic isolation context VRF of the first network device to a default VRF of the first network device, wherein the default VRF of the first network device communicates the route information to the second network device.

9. The method of claim 8, wherein the default VRF of the first network device communicates the route information to the second network device in the VPN table, wherein a field of the VPN table holds the VLAN tag.

10. The method of claim 1, wherein the traffic isolation context label is a tenant identifier.

11. The method of claim 1, wherein the network comprises a plurality of leaf devices, wherein the first network device is a first leaf device from the plurality of leaf devices, wherein the second network device is a spine device.

12. The method of claim 1, further comprising:

further comprising:

receiving VPN paths for a tenant from a plurality of leaf devices, wherein the first network device is a first leaf device from the plurality of leaf devices, wherein and the second network device is a spine device, wherein the spine device comprises a plurality of network interfaces.

13. The method of claim 1, wherein the VPN table comprises a border gateway protocol (BGP) VPN table.

14. The method of claim 1, wherein the first network device sends the VPN table to the second network device by establishing a BGP session.

15. A method for virtual routing and forwarding support across a network with dynamic provisioning, the method comprising:

at a first network device configured with a default virtual routing and forwarding instance (VRF) and a traffic isolation context VRF, the traffic isolation context VRF comprising host reachability information and having an associated subinterface configured with a VLAN tag that comprises a traffic isolation context label, exporting the host reachability information and the VLAN tag from the traffic isolation context VRF to the default VRF of the first network device; and providing, by the first network device, route information to a second network device, the route information comprising an address of the first network device as a next hop address, the host reachability information and the VLAN tag, wherein the first network device provides the route information to the second network device using a default VRF of the first network device, wherein providing the route information from the first network device to the second network device comprises sending a virtual private network (VPN) table that holds the VLAN tag for the subinterface such that the second network device receiving the VLAN tag in the VPN table triggers automatic configuration of the subinterface with the traffic isolation context VRF on a network interface over which the VPN table is received.

16. The method of claim 15, wherein the VLAN tag identifies a tenant.

17. A non-transitory, machine-readable medium having executable instructions to cause a processor to dynamically configure a network device, the executable instructions comprising instructions for:

receiving, over a network interface, route information from a next hop network device, the route information including an address for the next hop network device, a VLAN tag that comprises a traffic isolation context label for a traffic isolation context, and host reachability information;

determining a target virtual routing and forwarding instance (VRF) corresponding to the traffic isolation context;

configuring a subinterface of the network interface with the traffic isolation context label and the target VRF;

importing a reachability for the next hop network device into the target VRF; and importing a route into the target VRF based on the route information, the route comprising the host reachability information and a next hop address, wherein the next hop address is the address of the next hop network device, wherein receiving the route information from the next hop network device comprises receiving a virtual private network (VPN) table that holds the VLAN tag for the subinterface such that receiving the VLAN tag in the VPN table triggers automatic configuration of the subinterface with the traffic isolation context corresponding to the target VRF on the network interface over which the VPN table is received.

18. The non-transitory, machine-readable medium of claim 17, wherein importing the reachability of the next hop network device into the target VRF comprises translating the network interface to the subinterface, and wherein the route imported into the target VRF comprises the subinterface.

19. The non-transitory, machine-readable medium of claim 17, wherein:

configuring the subinterface of the network interface with the traffic isolation context label comprises setting the traffic isolation context label from the VPN table as a Layer 2 virtual local area network (VLAN) tag for the subinterface to insert into network traffic.

20. The non-transitory, machine-readable medium of claim 17, wherein the traffic isolation context label is a tenant identifier, and wherein the subinterface is an addressless subinterface.

* * * * *